(12) United States Patent
Novacek et al.

(10) Patent No.: US 12,221,321 B2
(45) Date of Patent: Feb. 11, 2025

(54) METHOD AND APPARATUS FOR MONITORING A STATE OF A PASSENGER TRANSPORT SYSTEM BY USING A DIGITAL DOUBLE

(71) Applicant: INVENTIO AG, Hergiswil (CH)

(72) Inventors: Thomas Novacek, Schwechat (AT); Alexander Pfeiler, Vienna (AT); Christoph Sander, Vienna (AT); Gerd Laglbauer, Kaltenleutgeben (AT); Hannes Dragsits, Vienna (AT)

(73) Assignee: Inventio AG, Hergiswil (CH)

( * ) Notice: Subject to any disclaimer, the term of this patent is extended or adjusted under 35 U.S.C. 154(b) by 1123 days.

(21) Appl. No.: 16/980,775

(22) PCT Filed: May 13, 2019

(86) PCT No.: PCT/EP2019/062122
§ 371 (c)(1),
(2) Date: Sep. 14, 2020

(87) PCT Pub. No.: WO2019/219553
PCT Pub. Date: Nov. 21, 2019

(65) Prior Publication Data
US 2021/0087021 A1 Mar. 25, 2021

(30) Foreign Application Priority Data
May 14, 2018 (EP) ..................................... 18172076

(51) Int. Cl.
*B66B 25/00* (2006.01)
*G05B 19/042* (2006.01)
*G07C 5/00* (2006.01)

(52) U.S. Cl.
CPC ........ *B66B 25/006* (2013.01); *G05B 19/0428* (2013.01); *G07C 5/006* (2013.01); *G05B 2219/2621* (2013.01)

(58) Field of Classification Search
CPC .............. B66B 25/006; G05B 19/0428; G05B 2219/2621; G07C 5/006
See application file for complete search history.

(56) References Cited

U.S. PATENT DOCUMENTS 4,401,192 A * 8/1983 Trosky .................. B66B 5/0037
702/182
8,708,130 B2 * 4/2014 De Coi ................... B66B 25/00
198/322

(Continued)

FOREIGN PATENT DOCUMENTS

CA 2524772 C 3/2012
CN 101695983 A 4/2010

(Continued)

OTHER PUBLICATIONS

International Search Report for International Application No. PCT/EP2019/062122 dated Jul. 23, 2019.

*Primary Examiner* — Sizo B Vilakazi
(74) *Attorney, Agent, or Firm* — Knobbe, Martens, Olson & Bear, LLP (57) ABSTRACT

A method and a device for monitoring a state of a physical passenger transport system are described. The method includes monitoring the state of the passenger transport system using an actualized digital replica dataset (ADRD) which reproduces characterizing properties of components of the passenger transport system in an actual configuration in a machine-processable manner after assembly and installation thereof in a building. At least one detection device is arranged in the physical passenger transport system and detects changes in at least one characterizing property that (Continued)

occur due to wear. These changes are transmitted to the ADRD, wherein changes and change trends in the components are monitored and evaluated using calculations and/or using static and dynamic simulations.

14 Claims, 4 Drawing Sheets

(56) References Cited

U.S. PATENT DOCUMENTS

| | | | | |
|---|---|---|---|---|
| 9,734,693 B2* | 8/2017 | McKinley | | G08B 25/10 |
| 2007/0250199 A1* | 10/2007 | Akasaka | | B66B 19/00 |
| | | | | 700/97 |
| 2012/0138391 A1* | 6/2012 | Weinberger | | B66B 5/0031 |
| | | | | 187/391 |
| 2015/0154324 A1* | 6/2015 | Reilio | | B66B 5/0087 |
| | | | | 703/1 |
| 2018/0029836 A1* | 2/2018 | Chen | | G01J 5/041 |
| 2018/0227277 A1* | 8/2018 | Fischer | | H04W 12/106 |
| 2021/0087021 A1* | 3/2021 | Novacek | | G05B 19/0428 |

FOREIGN PATENT DOCUMENTS

| | | |
|---|---|---|
| CN | 201592932 U | 9/2010 |
| CN | 102556824 A | 7/2012 |
| CN | 103 508 303 A | 1/2014 |
| CN | 103663084 A | 3/2014 |
| CN | 106 586 796 A | 4/2017 |
| CN | 106 335 837 B | 1/2018 |
| DE | 20210210 U1 | 1/2003 |
| DE | 10 2015 217 855 A1 | 3/2017 |
| JP | 11-194024 | 7/1999 |
| JP | 2009132513 A | 6/2009 |
| JP | 4915391 B2 | 4/2012 |
| JP | 6014211 B1 | 10/2016 |
| WO | WO 2018/177708 A1 | 10/2018 |
| WO | WO 2018177707 A1 | 10/2018 |
| WO | WO 2019/115378 | 6/2019 |

* cited by examiner

METHOD AND APPARATUS FOR MONITORING A STATE OF A PASSENGER TRANSPORT SYSTEM BY USING A DIGITAL DOUBLE

INCORPORATION BY REFERENCE OF ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to a method and device for monitoring properties of a passenger transport system configured as an escalator or moving walkway. The disclosure further relates to a passenger transport system equipped with a proposed device, a computer program product configured to carry out the proposed method, and a computer-readable medium storing this computer program product.

SUMMARY

Passenger transport systems in the form of escalators or moving walkways are used to convey passengers within edifices or buildings. Sufficient operational safety must always be ensured, but ideally also continuous availability. For this purpose, passenger transport systems are usually checked and/or serviced at regular intervals. The intervals are generally determined based on experience with similar passenger transport systems, wherein to ensure operational security the intervals must be selected to be short enough that a check or maintenance is performed in good time before any safety-endangering operating conditions occur.

In the case of older passenger transport systems, the checks are usually performed completely independently of the actual current state of the passenger transport system. This means that a technician has to visit the passenger transport system and inspect it on-site. It is often found that no urgent maintenance is necessary. The visit of the technician thus turns out to be superfluous and causes unnecessary costs. On the other hand, in the event that the technician actually detects the need for maintenance, in many cases an additional trip is required since the technician can only determine on-site which components of the passenger transport system require maintenance, and thus it is only apparent on-site that maintenance or repair is required, for example, that spare parts or special tools are needed. Another problem is that after a few years—especially if the maintenance is carried out by third-parties—there is no longer comprehensive technical documentation for the system and it is only possible to determine on-site which components are original and which components have been replaced by third-party products because there are a large number of suppliers exclusively for spare parts and for maintenance in this field.

In the case of newer passenger transport systems, it is sometimes already possible, for example, using sensors and/or by monitoring the active components of the system, for example, by monitoring the operation of a drive motor of the passenger transport system, to obtain notifications in advance and/or from an external control center that a state of the passenger transport system has changed and that a check or maintenance of the passenger transport system seems necessary. Such passenger transportation systems are described, for example, in WO2018/177708 A1 and CN 106 586 796 A. This means that maintenance intervals can hereby be extended or adjusted as required. However, even in this case, a technician can usually only detect whether there is actually a need for maintenance and whether spare parts or special tools may be needed by visiting the site. Even with these systems, comprehensive technical documentation can no longer be expected after a certain period, depending on the maintenance provider.

Among other things, there may be a need for a method or an apparatus by means of which properties of a passenger transport system can be monitored more efficiently, more simply, with less effort, without the need for an on-site inspection, and/or with greater predictability. There may also be a need for a suitably equipped passenger transport system, for a computer program product for carrying out the method on a programmable device, and for a computer-readable medium having such a computer program product stored thereon.

Such a need can be met with the subject matter described herein. Advantageous embodiments are defined throughout the following description.

According to a first aspect of the disclosure, a method for monitoring a state of a passenger transport system using an actualized digital replica dataset is proposed. The latter comprises the characterizing properties of components of the physical passenger transport system in a machine-processable manner after assembly and installation thereof in a building. The actualized digital replica dataset is referred to hereinafter in abbreviated form as "ADRD."

Furthermore, at least one detection device is arranged in the physical passenger transport system and detects changes in at least one characterizing property, said changes occurring due to wear on a traveling physical component of the passenger transport system.

In order to be able to carry out the method, there must be an ADRD, as mentioned in the foregoing. The generation of the ADRD comprises at least the following steps, but preferably not strictly in the order given: (i) Creating a commissioning digital replica dataset from component model datasets with target data which reproduce characterizing properties of components of the passenger transport system in a target configuration; (ii) Creating a production digital replica dataset based on the commissioning digital replica dataset by measuring actual data which reproduce characterizing properties of components of the physical passenger transport system in the actual configuration of the passenger transport system immediately after assembly and installation thereof in a building and replacing target data in the commissioning digital replica dataset with corresponding actual data; and (iii) Creating and continuously updating the ADRD based on the production digital replica dataset by modifying the production digital replica dataset during the operation of the physical passenger transport system, taking into account measurement values acquired by the detection device which reproduce changes in characterizing properties of traveling components of the physical passenger transport system during its operation. Creating and continuously updating the ADRD takes place, in particular, in that these changes are transmitted to the ADRD as measurement data and the characterizing properties of the component model datasets affected by the transmitted measurement data are updated accordingly.

In other words, the ADRD can be created and updated in several sub-steps. The data contained in the dataset can be successively improved and refined so that the characterizing properties of the components installed in the physical passenger transport system are reproduced more and more precisely with regard to their actual current configuration in the ADRD with continuous creation and are kept up-to-date with ongoing operation of the physical passenger transport system.

This means that the changes detected on the physical component influence at least one characterizing property of at least one component model dataset, or this characterizing property of the component model dataset must be updated accordingly. As explained in greater detail below in connection with the figures, the detected changes usually relate to a plurality of characterizing properties of several component model datasets. Each of these individual characterizing properties must be calculated for each affected component model dataset from the detected change using the geometric relationships available in the ADRD, the physical properties stored in the component model datasets, and known calculation methods from the fields of physics, mechanical engineering, and the science of strength of materials. The characterizing properties determined on the basis of the detected changes now replace the corresponding, previous characterizing properties of the affected component model datasets, so that the latter, or the ADRD, are updated.

The monitoring can be used to track and evaluate changes and trends in the at least one updated characterizing property of the traveling physical component and the influence of said changes on the component and on the components interacting with this component with the assistance of the ADRD using calculations and/or using static and dynamic simulations.

For evaluating, evaluation criteria associated with the characterizing properties of components, such as, for example, maximum chain elongation of conveyor chains, an upper limit for the power consumption by the drive motor, maximum and/or minimum dimensions at wear points, and the like may be present. These allow a simple comparison (static observation) of the changed characterizing property and specify, for example, the maximum permissible deviations based on target values. The characterizing properties of components of the ADRD can be compared to these evaluation criteria. Furthermore, dynamic simulations (for example, by means of finite element analysis, the decrease in strength due to material removal through wear) can affect the effects of the changed characterizing properties on the component in question and their effect on the components interacting with this component (e.g., increased freedom of movement or play due to the wear and thus risk of collision).

According to a second aspect of the disclosure, a device for monitoring a state of a passenger transport system is proposed. It comprises an actualized digital replica dataset that reproduces characterizing properties of components of the passenger transport system in an actual configuration of the physical passenger transport system in a machine-processable manner after the assembly and installation thereof in a building. In addition, the device comprises at least one detection device using which changes in at least one characterizing property which occur due to wear on a traveling physical component of the physical passenger transport system can be detected. These changes can be transmitted to the ADRD as measurement data for the purpose of updating existing data.

As already mentioned, the ADRD can be generated by: (i) Creating a commissioning digital replica dataset with target data which reproduce characterizing properties of components of the passenger transport system in a target configuration; (ii) Creating a production digital replica dataset based on the commissioning digital replica dataset by measuring actual data which reproduce characterizing properties of components of the physical passenger transport system in the actual configuration of the passenger transport system immediately after the assembly and installation thereof in a building and replacing target data in the commissioning digital replica dataset with corresponding actual data; and (iii) Creating and continuously updating the ADRD based on the production digital replica dataset by modifying the production digital replica dataset during the operation of the physical passenger transport system (2), taking into account measured values acquired by the detection device (200) which reproduce changes in the characterizing properties of traveling components of the physical passenger transport system during its operation.

By means of static and dynamic simulations on the ADRD, the wear-related changes and change trends in the characterizing properties of the traveling virtual component and their effects on virtual components of the passenger transport system interacting with said component can be tracked and evaluated at any time. Since the virtual components of the ADRD provide as accurate a copy as possible of the corresponding physical components of the physical passenger transport system, the calculations, findings, and evaluations for the virtual components are also valid almost 1:1 for the corresponding physical components of the physical passenger transport system.

According to a third aspect of the disclosure, a passenger transport system is proposed which comprises a device according to an embodiment of the second aspect of the disclosure.

According to a fourth aspect of the disclosure, a computer program product is proposed which comprises machine-readable program instructions which, when executed on a programmable device, cause the device to carry out or control a method according to an embodiment of the first aspect of the disclosure.

According to a fifth aspect of the disclosure, a computer-readable medium is proposed, on which is stored a computer program product according to an embodiment of the fourth aspect of the disclosure.

Possible features and advantages of embodiments of the disclosure may be considered, inter alia, and without limiting the disclosure, as being based on the ideas and findings described below.

As noted in the foregoing, until now passenger transport systems generally had to be inspected on-site in order to be able to detect whether maintenance or repair was currently necessary and, if so, what specific measures had to be taken, i.e., for example, which spare parts and/or tools were required.

In order to avoid this, it is proposed to use a so-called actualized digital replica dataset for monitoring properties characterizing the current state of the passenger transport system. The ADRD should comprise data which characterize the characterizing properties of the components forming the passenger transport system and provide, in its entirety, as complete a digital copy as possible of the physical passenger transport system assigned to the ADRD. The data of the ADRD should characterize the properties of the components in their actual configuration, that is, in a configuration in which the components have been fully completed and then assembled to form the passenger transport system and installed in a building. Likewise, operational changes are continuously transmitted to the ADRD, so that the latter is always updated to the current state of the assigned physical passenger transport system over the entire service life thereof.

In other words, the data contained in the ADRD do not merely reproduce target properties of the components, such as are assumed, for example, during planning, designing, and commissioning of the passenger transport system, and such as they can be taken, for example, from CAD data used therein and relating to the components. Instead, the data contained in the ADRD are intended to reproduce the actual properties of the components installed in the fully assembled and installed passenger transport system. The ADRD can thus be considered to be a virtual copy of the finished passenger transport system or the components contained therein.

The data contained in the ADRD should reproduce the characterizing properties of the components in sufficient detail to be able to derive information therefrom about the current structural and/or functional properties of the passenger transport system. In particular, using the ADRD, it should be possible to derive information about current structural and/or functional properties which characterize an updated state of the entire passenger transport system, it being possible to use this information to evaluate the current or future operational safety of the passenger transport system, the current or future availability thereof, and/or a current or future need for maintenance or repair thereof.

A particular advantage results from the use of the ADRD during the entire service life of the physical passenger transport system. That is, if the ADRD continues to be used, comprehensive documentation or updating of the data for the ADRD is required, since otherwise the operational monitoring, maintenance predictions, and the determinations of state are based on incorrect data. This means that when components are replaced, the characterizing properties of the replacement parts must be recorded digitally. During the maintenance work in the ADRD, the characterizing properties of the components removed are replaced by the characterizing properties of the replacement parts. Any adjustment measures must also be recorded and transmitted to the ADRD. In order to make the work easier for the fitters, the component measuring work and adjustments can be recorded on-site using optical detection devices such as, for example, a laser scanner or TOF camera (time of flight camera). The data thereof are then automatically evaluated by a processing program, processed for the ADRD, and transmitted thereto.

The ADRD thus differs, for example, from digital data which are conventionally generated or used in the production of passenger transport systems. For example, when planning, designing, or commissioning a passenger transport system, it is common to use computers and CAD programs to plan or design the components used, so that corresponding CAD data reproduce, for example, a target geometry of a component. However, such CAD data do not indicate what geometry a produced component actually has, wherein, for example, production tolerances or the like can lead to the actual geometry differing significantly from the target geometry.

In particular, conventionally used data such as CAD data do not indicate which characterizing properties components have assumed after they have been assembled to form the passenger transport system and installed in a building. Depending on how the assembly and installation were performed, there may be significant changes in the characterizing properties of the components compared to the originally designed target properties thereof and/or compared to the properties thereof immediately following production but prior assembly and installation.

The ADRD is also distinguished from data as they are conventionally used in part during production of complex workpieces and machines. For example, DE 10 2015 217 855 A1 describes a method for checking consistency between reference data of a production object and data of a so-called digital twin of the production object. A digital copy of a workpiece, referred to as a digital twin, is synchronized with the state of the workpiece during production. For the production process, this means that after each production step the data reproducing the digital twin are modified such that the changes in the properties of the workpiece to be brought about by the production step are to be taken into account.

For example, it can be provided in a production step to remove a region of the workpiece by grinding, turning, or the like in accordance with target specifications so that, after the production step has been carried out, the digital twin is also modified in accordance with the target specifications. In this way, the digital twin should always provide information about the current intermediate state of the workpiece during the production thereof.

However, particularly in the production of components for passenger transport systems, DE 10 2015 217 855 A1 does not provide for taking into account in the digital twin data which reproduce the actual characterizing properties of the components, in particular actual characterizing properties of the components after assembly thereof to form a completed passenger transport system and installation thereof in the building. Instead, the data in the digital twin are mostly based exclusively on target properties such as can be reproduced, for example, in the form of CAD data.

In order to be able to monitor the state of a passenger transport system with sufficient accuracy and/or reliability, or possibly even to forecast said state, it is now proposed to provide the data used for this purpose in the form of the ADRD. The ADRD provides information that is about the characterizing properties of the components installed in the passenger transport system in their actual configuration, and this information extends beyond mere target properties and is continuously or periodically compared to the physical passenger transport system and updated. Such information can advantageously be used, for example, to be able to detect deviations in the actual characterizing properties from originally designed characterizing properties of the passenger transport system. It is possible to infer from such deviations, for example, whether there is already a need for maintenance or repair of the passenger transport system, whether there is a risk of increased or premature wear, etc. For example, the deviations can arise from production tolerances that occur during the production of the components, from changes in the characterizing properties of the components during the assembly of the components or during the installation thereof in the building, and/or from changes in the characterizing properties of the components that occur during the final operation of the passenger transport system, said changes resulting, for example, from wear.

Due to the fact that the ADRD, as a virtual digital copy of the actual passenger transport system, allows inferences to be made about the characterizing properties currently prevailing in the passenger transport system, in the best case information which allows inferences to be made about the current state of the passenger transport system and in particular about any maintenance or repair that may be necessary can be obtained solely by analyzing and/or processing the ADRD. It is even possible to derive information about which spare parts and/or tools are needed for upcoming maintenance or repair.

The ADRD can be stored, analyzed, and/or processed in a computer configured for carrying out the method proposed here or in a corresponding data processing system. In particular, the computer or the data processing system can be arranged remotely from the passenger transport system to be monitored, for example, in a remote monitoring center.

Accordingly, the use of the ADRD makes it possible to monitor remotely, continuously or at suitable time intervals, properties characterizing the state of the passenger transport system, in particular to detect changes that make maintenance or repair seem necessary. If necessary, specific information based hereon regarding work to be carried out during maintenance or repair can be derived in advance, based solely on an analysis of the ADRD, without a technician actually having to inspect the passenger transport system on-site. This can considerably reduce effort and costs involved.

According to one embodiment, the measurement data transmitted by the detection device can be stored in a log file with time information. This has the advantage, on the one hand, that a measurement data history is available from which, for example, special events can be read out, such as instantaneous excessive force due to improper use or due to external influences such as seismic impacts and the like.

On the other hand, a change trend in the measured values can be determined by means of statistical methods by means of the measurement data stored in the log file and operating data stored in the log file. Operating data are data that arise during the operation of a passenger transport system, for example, total operating time, drive motor power consumption, ambient temperature, operating temperature, and the like. The information gained through operating data can be used in many ways. If the change trend is linear, it is quite simple to predict the end of service life for the affected component due to constant wear. If the change trend drifts downward, this indicates a running-in behavior and thus an increasingly stable state of the component in question. Increased signs of wear can be diagnosed when there is an upward drift in the change trend. Additional advantages are listed below.

According to another embodiment, the measured values can be transmitted continuously, periodically and/or as a function of the change trend for the measured values. If there is a relationship with the change trend, this means that a fixed period can be selected if the change trend is linear. With a decreasing tendency, the period can be increasingly extended, whereas with an increasing tendency, the period between two measurements can be shortened.

According to another embodiment, the wear-related characterizing properties of the traveling physical component to be taken into account when updating the ADRD can be geometric dimensions of the component, the weight of the component, and/or the surface quality of the component.

In other words, several different characterizing properties of a component or of a plurality of components of a passenger transport system which are subject to changes due to signs of wear can be measured, for example, by a sensor system installed in the physical passenger transport system. The measurement results obtained can be stored as data in the ADRD. Geometric dimensions of the components can be, for example, a length, width, height, cross-section, radii, fillets, etc., of the components. The surface quality of the components can comprise, for example, roughnesses, textures, coatings, colors, reflectivities, etc., of the components.

The characterizing properties can relate to individual components or component groups. For example, the characterizing properties can relate to individual components from which larger, more complex component groups are composed. As an alternative or in addition, the properties can also relate to more complex devices composed of a plurality of components, such as drive motors, gear units, conveyor chains, etc.

The characterizing properties can be ascertained or surveyed with high precision. In particular, the characterizing properties can be ascertained or surveyed with a precision that is more precise than the tolerances to be observed during the production of the components.

Since in particular the traveling components of passenger transport systems such as escalators and moving walkways are subject to wear, the characterizing property of the traveling physical component measured by the detection device and changed due to wear can be:

The length of a drive chain or slack in the drive chain resulting from the wear-related change in length;
The length of a conveyor chain or a displacement of a deflection curve or deflection sprocket from its conveyor chain tensioning device resulting from the wear-related change in length; and/or
The length of a handrail or displacement of a roller curve from its handrail tensioning device resulting from the wear-related change in length.

According to another embodiment, monitoring the state of the physical passenger transport system also includes simulating future characterizing properties of the passenger transport system using the actualized digital replica dataset.

In other words, not only should the properties currently prevailing in the passenger transport system be monitored using the actualized digital record double, but also it should be possible to make inferences about the characterizing properties that will prevail in the passenger transport system in the future by means of simulations to be carried out using the actualized digital replica dataset.

The simulations can be carried out on a computer system. Using the simulations, it is possible to make inferences about a temporal development in the represented characterizing properties, and thus make forecasts or extrapolations relating to future characterizing properties of the components, proceeding from data currently contained in the actualized digital replica dataset and, if appropriate, taking into account data previously contained in the actualized digital replica dataset. In simulations, it is possible to take into account natural law conditions as well as experience with other passenger transport systems.

For example, simulations can take into account how, for example, wear-related changes in the characterizing properties of components have an effect on further changes in these characterizing properties that are expected in the future. As an alternative or in addition, the simulations can take into account experiences gained from experiments and/or by observing other passenger transport systems and from which, for example, a statement can be derived as to when a change in the characterizing properties of a component that has occurred or is expected in the future for the function of the entire passenger transport system should be regarded as substantial, so that suitable measures should be initiated, for example, as part of maintenance or repair.

It is also possible to develop and test new, improved physical components and in particular control components (hardware and software) with the help of the actualized digital replica dataset. According to the hardware-in-the-loop approach, the component model dataset of a component to be tested can be deactivated in the actualized digital replica dataset and can be connected to the component to be tested via suitable interfaces. The suitable interface can be a test bench adapted to the mechanical and/or electrical interfaces of the physical component and connected to a computer system having the actualized digital replica dataset. In other words, in accordance with the hardware-in-the-loop approach, an embedded system (e.g., real electronic control unit or real mechatronic component, the physical component or the physical component group) is thus connected via its inputs and outputs to the actualized digital replica dataset, the actualized digital replica dataset acting as a replica of the real environment of the system or of the entire escalator or the entire moving walk. In this way, the actualized digital replica dataset can safeguard embedded systems, provide support during development, and contribute to early start-up of machines and systems from the perspective of the test.

Another advantage of the actualized digital replica dataset is its inherent systems engineering approach. The focus of systems engineering is to meet the customer's requirements for the system to be delivered, which requirements are included in the specification, within the cost and time frame in that the system is broken down into and specified as subsystems, devices and software, and, secondly, implementation across all levels is monitored until delivery is made to the customer. The entire problem (operation, costs, schedule, performance, training and support, testing, production and recycling) should be taken into account. Systems engineering integrates all of these engineering disciplines and skills into a uniform, team-oriented, structured process which, depending on the complexity of the system, can extend over several levels to a device of a subcontractor. This process is used from conception to production to operation and in some cases to dismantling or recycling. By mapping all physical components as component model datasets with all their characterizing properties and interface information—combined and constantly updated in the actualized digital replica dataset—this offers an excellent system engineering platform to meet the customer's requirements in the shortest possible time for the deliverable escalator or moving walkway beyond the installation of the physical product.

According to one embodiment of the disclosure, the method proposed herein can further comprise planning maintenance work to be carried out on the passenger transport system based on the monitored properties of the passenger transport system.

In other words, the information obtained when monitoring the properties of the inventive passenger transport system can be used in order to be able to appropriately plan future maintenance work, including any necessary repairs, in advance. It can be of advantage here that valuable information can be obtained just by analyzing the actualized digital replica dataset, for example, information about what changes have occurred in a monitored passenger transport system and/or what wear on components of the passenger transport system must actually be expected. This information can be used to be able to plan for maintenance work, for example, with regard to a time of maintenance and/or with regard to activities to be carried out during maintenance and/or with regard to spare parts or tools to be kept available during maintenance, and/or with regard to technicians performing the maintenance who may need to have special skills or knowledge. In most cases, planning for the maintenance work can take place purely based on analysis of the actualized digital replica dataset, that is, without a technician having to inspect the passenger transport system on-site.

According to another embodiment of the disclosure, the proposed method further comprises evaluating quality properties of one of the traveling components based on an analysis of ADRD of a plurality of passenger transport systems containing the component in question.

In other words, it is proposed to use the ADRDs of several different passenger transport systems and to analyze said ADRDs such that information relating to the traveling component to be examined is collected and analyzed. The analysis can comprise, for example, comparing the actual values for characterizing properties of the component in its actual configuration after assembly and installation of the passenger transport system to previously assumed target values and, if necessary, taking into account tolerance values assigned to these target values. It is not only the actual values of an individual traveling component that are compared to the target values for this component. Instead, the actual values of a plurality of traveling components of the same component type are compared to the target values of this component type.

For example, it can be inferred from the frequent occurrence of excessive wear or even defects in a certain type of handrail belt which after production has satisfactorily met the target specifications for this component type that the design of the component type in question has quality defects that lead, for example, to recurring problems in real operation. For example, in the design alone of a component type it can be recognized that excessive changes, in particular excessive wear, occur in this component type after the assembly and installation of the passenger transport system or at the latest during its operation and lead to a short service life for components of this type. Thereupon, the design of the component type can possibly be changed appropriately in order to minimize wear, that is, to increase the component's robustness, and to increase the service life of the component type.

However, the commissioning digital replica dataset described above is not simply available "off the shelf." According to another embodiment, creating the commissioning digital replica dataset includes preliminary creation of a digital replica dataset taking into account customer-specific configuration data and creating production data by modifying the digital replica dataset taking into account production-specific data.

In other words, both customer-specific configuration data and production-specific data should be taken into account when initially creating the commissioning digital replica dataset. As a rule, a digital replica dataset is first created from component model datasets, taking into account the customer-specific configuration data, and then this digital replica dataset is modified or refined, taking into account the production-specific data. Creating the commissioning digital replica dataset can also possibly include numerous iterative calculations and modifications to data from the digital replica dataset, taking into account customer and/or production specifications.

Customer-specific configuration data can be understood to mean specifications which are specified by the customer in individual cases, for example, when ordering the passenger transport system. The customer-specific configuration data typically relate to a single passenger transport system to be produced. For example, the customer-specific configuration data can comprise prevailing spatial conditions at the installation location, interface information for attaching to supporting structures of a building, etc. In other words, the customer-specific configuration data can specify, for example, how long the passenger transport system should be, what height difference is to be overcome, how the passenger transport system should be connected to supporting structures within the building, etc. Customer-specific configuration data can also include customer wishes with regard to functionality, conveying capacity, optics, etc. The data for the digital replica dataset can be present, for example, as a CAD dataset which, inter alia, reproduces geometric dimensions and/or other characterizing properties of the components forming the passenger transport system as characterizing properties.

The production-specific data typically relate to properties or specifications within a manufacturing plant or production line in which the passenger transport system is to be manufactured. For example, depending on the country or location in which a production factory is located, various conditions may exist in the production factory and/or various requirements may have to be met. For example, in some production factories certain materials, raw materials, raw components or the like may not be available or may not be processed. In some factories, machines can be used that are not available in other factories. Due to their layout, some factories are subject to restrictions with regard to the passenger transport systems or components thereof to be produced. Some production factories allow a high degree of automated production, whereas other production factories use manual production, for example, due to low labor costs. There may be a multitude of other conditions and/or requirements for which production environments can differ. All of these production-specific data typically have to be taken into account when planning or commissioning a passenger transport system, since these data may have a critical role in how a passenger transport system can actually be built. It may be necessary to fundamentally modify the initially created digital replica dataset, which only took into account the customer-specific configuration data, in order to be able to take the production-specific data into consideration.

Static and/or dynamic simulations are preferably carried out when the digital replica dataset is created, and the commissioning digital replica dataset is created taking results of the simulations into account. One of these dynamic simulations can be, for example, a starting behavior for an escalator. In this case, all friction forces as well as clearances and the properties dependent on the drive motor are simulated, from standstill to nominal speed. With these simulations, points critical to collision can be checked and the dynamic forces acting on the individual components or component model datasets can be determined during the start-up.

In other words, for creating the digital replica dataset, which, taking into account the customer-specific configuration data, forms the basis of the commissioning digital replica dataset, simulations can be performed with which static and/or dynamic properties of the commissioned passenger transport system are simulated. Simulations can be performed in a computer system, for example.

Static simulations analyze, for example, a static interaction of a plurality of assembled components. With the help of static simulations, it is possible to analyze, for example, whether complications can arise during assembly of a plurality of predefined components or components specified appropriately based on component model datasets, for example, because each of the components is manufactured with certain manufacturing tolerances so that there can be problems if the sum of manufacturing tolerances is unfavorable.

Dynamic simulations, for example, analyze the dynamic behavior of components during the operation of the assembled passenger transport system. By means of dynamic simulations, for example, it is possible to analyze, for example, whether moving components, especially the traveling components, within a passenger transport system can be moved in a desired manner or whether there is a risk of collisions between components moving relative to one another.

From the foregoing, it can be seen that initially only target data based on the data determined when planning and commissioning the passenger transport system are stored in the commissioning digital replica dataset. These target data can be obtained, inter alia, if, for example, computer-assisted commissioning tools are used to calculate the characterizing properties of a passenger transport system to be produced, depending on customer specifications. For example, data relating to target dimensions, target numbers, target material properties, target surface quality, etc., of components to be used in the production of the passenger transport system can be stored in the commissioning digital replica dataset.

The commissioning digital replica dataset thus represents a virtual copy of the passenger transport system in its planning phase or commissioning phase, that is, before the passenger transport system is actually produced and installed using the commissioning digital replica dataset.

Proceeding from the digital replica dataset, the target data contained therein can then be successively replaced by actual as production progresses, and a production digital replica dataset can be generated. The actual data indicate characterizing properties of the components of the passenger transport system, initially only defined with regard to their target configuration, in their actual configuration immediately after assembly and the installation of the passenger transport system in the building. The actual data can be ascertained by manual and/or mechanical surveying of the characterizing properties of the components. Separate measuring devices and/or sensors integrated in components or arranged on components can be used for this purpose.

The production digital replica dataset thus represents a virtual copy of the passenger transport system immediately after completion thereof, e.g., after the assembly of the components and the installation in the building.

When the physical passenger transport system is started up, its production digital replica dataset in the ADRD is supplemented with the occurring operating data and operating adjustment data. During the subsequent operation of the passenger transport system, the ADRD is updated continuously or at suitable intervals. For this purpose, the data initially stored in the ADRD are modified during operation of the passenger transport system such that observed changes in the characterizing properties of the components forming the passenger transport system are taken into account.

To this end, a detection device with sensors can be provided in the passenger transport system as measuring devices by means of which the characterizing properties to be observed can be monitored. Such sensors can monitor geometric dimensions of individual or multiple components, for example. Alternatively or in addition, sensors can measure forces acting between components, prevailing temperatures in components, mechanical stresses acting within components or between components, electrical and/or magnetic fields prevailing in components, and much more. Since the traveling physical components in particular of an escalator or moving walkway, such as the step belt or pallet belt, the handrail, or the drive chain, are subject to wear during operation, according to the disclosure suitable sensors are provided for detecting the characterizing properties, of these components in particular.

Changes occurring over time in the measurement values supplied by the sensors indicate changes in the observed characterizing properties, so that the data contained in the ADRD can be modified accordingly. The ADRD modified in this way thus represents a virtual copy of the passenger transport system during the operation thereof and taking into account, for example, wear-related changes in comparison to the characterizing properties originally measured immediately after completion, and can thus be used as ADRD for continuous or repeated monitoring of the properties of the passenger transport system.

Logically, not all of the characterizing properties of a component that are present as target data must necessarily be updated by actual data of the component. As a result, the characterizing properties of most components of a production digital replica dataset and of the resultant ADRD are characterized by a mixture of target data and actual data.

Specific embodiments of how an ADRD can be created for an escalator or moving walkway and how the state of the escalator or moving walkway can be monitored based thereon are set out below, referencing preferred embodiments.

Embodiments of the method presented herein for monitoring the state of a passenger transport system can be performed using a device specially configured for this purpose. The device can comprise one or more computers. In particular, the device can be formed from a computer network which processes data in the form of a data cloud. For this purpose, the device can have a storage device in which the data of the ADRD can be stored, for example, in electronic or magnetic form. The device can also have data processing options. For example, the device can have a processor which can be used to process the data in the ADRD. The device can furthermore have interfaces via which data can be input into and/or output from the device. In particular, the device can have a detection device with sensors arranged on or in the passenger transport system and by means of which the characterizing properties of components of the passenger transport system can be measured. The device can in principle be part of the passenger transport system. However, the device is preferably not arranged in the passenger transport system, but rather remote from it, for example, in a remote control center from which the state of the passenger transport system is to be monitored. The device can also be implemented in a spatially distributed manner, for example, if data are processed in a data cloud and distributed over a plurality of computers.

In particular, the device can be programmable, that is, it can be caused by a suitably programmed computer program product to execute or control the inventive method. The computer program product can contain instructions or code which, for example, cause the processor of the device to store, read, process, modify, etc., data of the digital replica dataset. The computer program product can be written in any computer language.

The computer program product can be stored on any computer-readable medium, for example, a flash memory, CD, DVD, RAM, ROM, PROM, EPROM, etc. The computer program product and/or the data to be processed therewith can also be stored on a server or a plurality of servers, for example, in a data cloud, from where these data can be downloaded via a network, for example, the internet.

Finally, it is pointed out that some of the possible features and advantages of the disclosure are described herein with reference to different embodiments of both the proposed method and the correspondingly configured device for monitoring properties of a passenger transport system. A person skilled in the art recognizes that the features can be combined, transferred, adjusted, or exchanged in a suitable manner in order to arrive at further embodiments of the disclosure.

BRIEF DESCRIPTION OF THE DRAWINGS

Embodiments of the disclosure will be described in the following with reference to the accompanying drawings, wherein neither the drawings nor the description are intended to be interpreted as limiting the disclosure.

The figures are merely schematic and are not true to scale. Identical reference numbers designate identical or equivalent features in the various figures.

DETAILED DESCRIPTION

Figure 1:
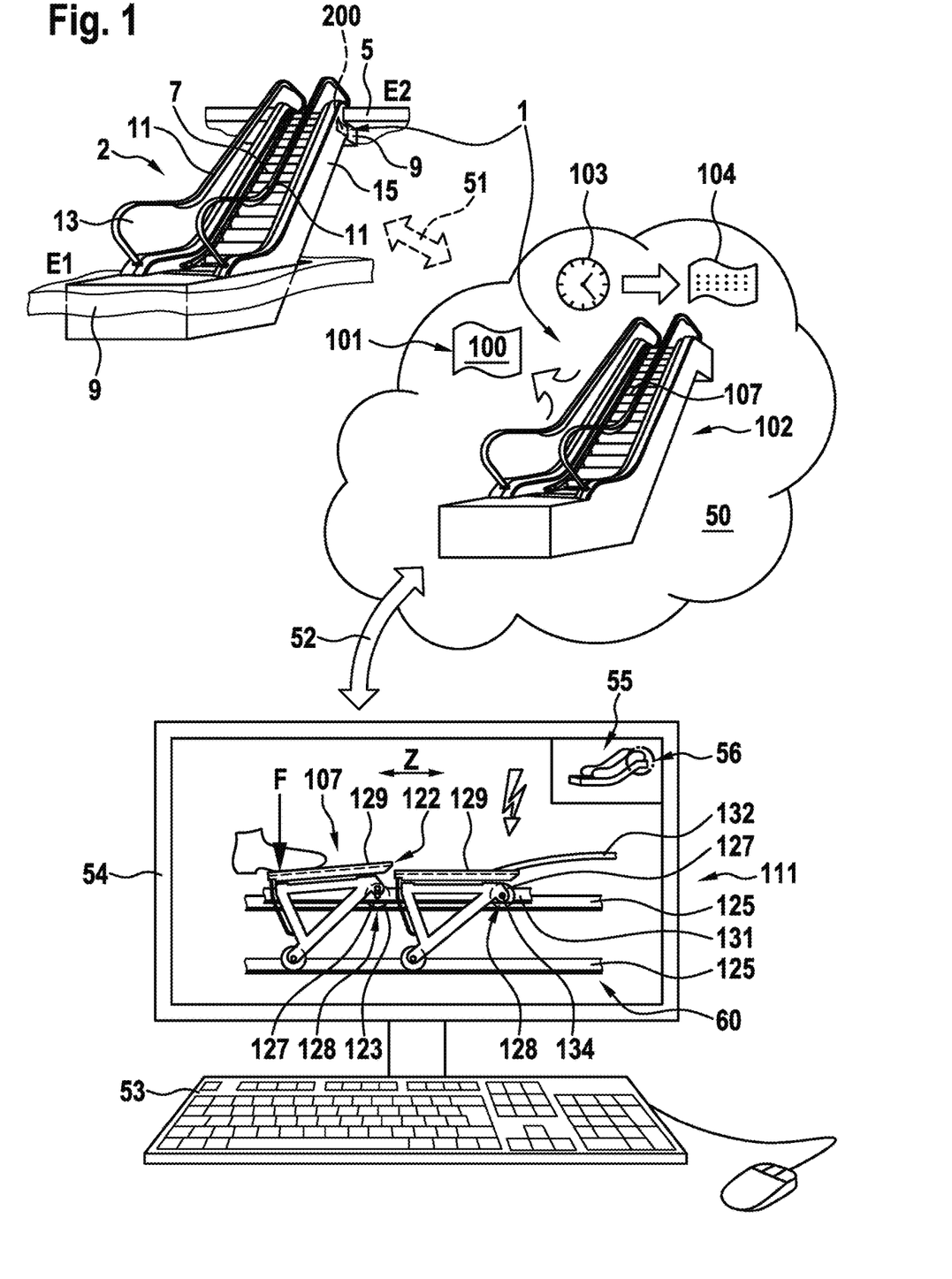
FIG. 1 illustrates an embodiment of an apparatus comprising a detection device arranged in a physical passenger transport system, and an actualized replica digital dataset (ADRD) which depicts the physical passenger transport system and is stored in a data cloud and with which device the inventive method can be carried out.

FIG. 1 illustrates a device 1 according to the disclosure comprising a detection device 200 which is arranged in a physical passenger transport system 2 and an actualized digital replica dataset (ADRD) 102 of the physical passenger transport system 2, which is stored in a data cloud (cloud) 50, wherein a method 100 according to the disclosure can be carried out by means of the device 1.

The physical passenger transport system 2 illustrated in FIGS. 1 and 2 (described together below) is configured in the form of an escalator and connects levels E1 and E2, which are at different elevations and spaced horizontally apart from one another in a building 5. The physical passenger transport system 2 can be used to transport passengers between the two levels E1 and E2. The physical passenger transport system 2 is supported at its opposing ends on support points 9 of the building 5.

Figure 2:
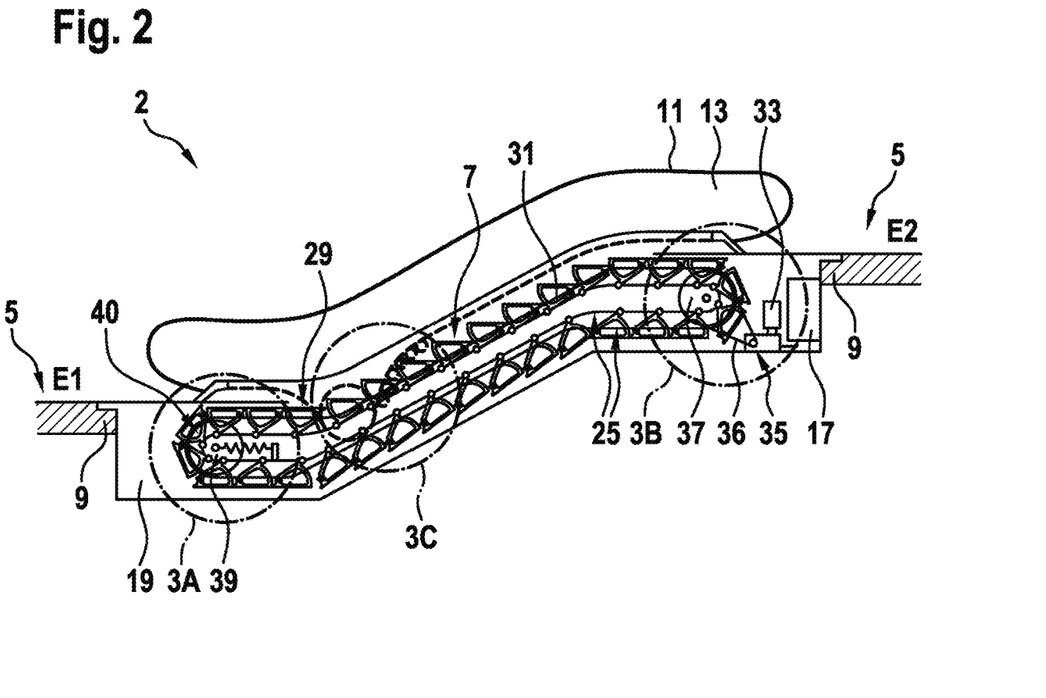
FIG. 2 illustrates the escalator from FIG. 1 in a sectional side view.

The physical passenger transport system 2 further comprises a support structure 19, shown only in its outline in FIG. 2, which receives all other components of the physical passenger transport system 2 in a load-bearing manner. These include statically arranged physical components such as guide rails 25, a drive motor 33, a transmission element 35, a control unit 17, drive sprockets 37 driven by the drive motor 33 via the transmission element 35, and a deflection curve 39. The physical passenger transport system 2 further comprises balustrades 13 arranged above and on the support structure 19 on its two longitudinal sides. The deflection curve 39 is part of a conveyor chain tensioning device 40.

Furthermore, the physical passenger transport system 2 also has traveling components 7, 11, 31, 36 which are naturally subject to wear during operation. These are, in particular, a step belt 7, which is arranged traveling between the drive sprockets 37 and the deflection curves 39, two handrails 11 or handrail belts, which are arranged traveling on the balustrades 13, and a drive chain 36, which is part of the transmission element 35 as a transmission member. The step belt 7 comprises escalator steps 29 and conveyor chains 31 as well as a number of further components such as step rollers, chain rollers, step axles, and the like.

Alternatively, the passenger transport system 2 can also be configured as a moving walkway (not shown) constructed similar or identical to an escalator 2 in terms of many of its components.

As FIG. 1 illustrates, many components of the physical passenger transport system 2, such as the panel wall 19, guide rails 25, the entire drive train 35, the drive sprockets 37 and deflection curves 39, the electrical equipment such as power and signal lines, sensors, and the control unit 17, are covered and protected using trim components 15 and are therefore not visible from the outside. Only part of the escalator steps 29 of the advance that can be accessed by passengers is visible for the step belt 7 in FIG. 1, as well.

According to FIG. 1, the device 1 also comprises an actualized digital replica dataset 102, referred to as ADRD 102 in the following for better readability. The ADRD 102 is a virtual copy that is as comprehensive as possible and tracks the current physical state of the physical passenger transport system 2 and therefore represents a virtual passenger transport system assigned to the physical passenger transport system 2. This means that the ADRD 102 is not just a virtual envelope model of the physical passenger transport system 2, roughly representing its dimensions, but also includes and reproduces in digital form in the ADRD 102 every single physical component, from the handrail 11 to the last screw, with as many of its characterizing properties as possible.

According to the disclosure, characterizing properties of components can be geometric dimensions of the components, such as, for example, a length, width, height, cross-section, radii, fillets, etc. The surface quality of the components, such as, for example, roughness, textures, coatings, colors, reflectivities, etc., are also characterizing properties. Furthermore, material values such as, for example, the modulus of elasticity, bending fatigue strength, hardness, notched impact strength, tensile strength, etc., can also be stored as characterizing properties of each component. These are not theoretical properties (target data) such as those found on a production drawing, but rather characterizing properties actually determined on the physical component (actual data). Information relevant to assembly, such as the actually applied tightening torque for a screw, and thus its pretensioning force, is preferably assigned to each component.

The device 1 can comprise one or a plurality of computer systems 111, for example. In particular, the device 1 can comprise a computer network which stores and processes data in the form of a data cloud 50 (cloud). For this purpose, the device 1 can have a storage element or, as shown symbolically, storage resources in the data cloud 50 in which the data of the ADRD 102 (symbolically illustrated as a three-dimensional copy of the physical passenger transport system 2) can be stored, for example, in electronic or magnetic form. This means that the ADRD 102 can be stored in any storage location.

The device 1 can also have data processing options. For example, the device 1 can have a processor that can be used to process the data in the ADRD 102. The device 1 can furthermore have interfaces 53, 54 via which the data can be input into the device 1 and/or output from the device 1. In particular, the device 1 can have internal interfaces 51, 52, wherein the interface 51 between the ADRD 102 and the physical passenger transport system 2 enables communication with sensors of the detection device 200 which are arranged on or in the passenger transport system 2 and with which characterizing properties of components of the passenger transport system 2 can be measured and determined directly or indirectly.

In principle, the device 1 can be implemented in its entirety in the physical passenger transport system 2, wherein the ADRD 102 thereof is stored, for example, in control unit 17 thereof and the data of the ADRD 102 can be processed by the control unit 17.

However, the ADRD 102 of the device 1 is preferably not stored in the physical passenger transport system 2, but instead remote therefrom, for example, in a remote control center from which the state of the physical passenger transport system 2 is to be monitored or in which a data cloud 50 can be accessed from anywhere, for example, via an internet connection. The device 1 can also be implemented in a spatially distributed manner, for example, when data of the ADRD 102 are processed in a distributed manner in the data cloud 50 via a plurality of computers.

In particular, the device 1 can be programmable, that is to say it can be caused to execute or control the inventive method 100 using a suitably programmed computer program product 101 comprising the ADRD 102. The computer program product 101 can contain instructions or code which, for example, cause a processor of the device 1 to store, read, process, modify, etc., data of the ADRD 102 according to the implemented method 100. The computer program product 101 can be written in any computer language.

The computer program product 101 can be stored on any computer-readable medium, for example, a flash memory, CD, DVD, RAM, ROM, PROM, EPROM, etc. The computer program product 101 and/or the data to be processed therewith can also be stored on a server or a plurality of servers, for example, in the data cloud 50, from where these data can be downloaded via a network, for example, the internet.

Based on the data available in the ADRD 102, the latter or its virtual components can be called up by executing the computer program product 101 in a computer system 111 and represented as a three-dimensional, virtual passenger transport system. The latter can be "walked through" and explored virtually using zoom functions and movement functions. Movement sequences, collision simulations, static and dynamic strength analyses using the finite element method, and interactive queries on current characterizing properties of individual virtual components and component groups are also possible. This means that, for example, the virtual traveling step belt 107, which is the counterpart of the physical step belt 7, is selected from the ADRD 102 and its updated, characterizing property, such as a change in length due to wear, can be queried in comparison to the new state.

In order for it to be possible for meaningful state analyses and state simulations to be carried out by means of the ADRD 102, in particular the characterizing properties of components subject to wear must be updated continuously or periodically in the virtual component datasets of the ADRD 102. These update queries can be initialized automatically using the method 100 implemented in the computer program product 101. However, they can also be initialized from "outside," that is, via an input, for example, via the interface 53 of the computer system 111 illustrated as a keyboard. The actual updating of the characterizing properties takes place via the interface 51 between the physical passenger transport system 2 and the ADRD 102 or the running computer program (method 100) of the computer program product 101. In this case, measured values from corresponding sensors or sensor systems of the detection device 200 (see also FIG. 3A through 3C) are queried and these measured values are optionally further processed in order to arrive at the characterizing properties of the components influenced or affected by the measured value. The measured values and the resulting characterizing properties can be stored in a log file 104. In order to sort these entries historically, said entries can be stored in the log file 104 with time information 103. The acquisition of measured values and their further processing in order to arrive at characterizing properties of the components influenced or affected by the measured value is explained in greater detail below in connection with FIG. 3A through 3C.

As illustrated schematically in FIG. 1, a user, for example, a technician, can query the state of the physical passenger transport system 2 by starting or accessing the computer program 100 of the computer program product 101 via the computer system 111. The computer system 111 can be a fixed component of the device 1, but it can also assume only a temporary association while it is used to access data from the ADRD 102 via the interface 52.

In the present exemplary embodiment in FIG. 1, the technician selected a region 60 of the ADRD 102 via zoom functions. A small navigation graphic 55 can be displayed on the screen 54 which acts as data output and on which the selected region 60 is indicated by means of a pointer 56. The selected region 60 is the virtual access region available in the level E2, the virtual escalator steps 129 moving under the virtual comb plate 132 arranged there. Because the region 60 has been zoomed in on, only the virtual guide rails 125, the virtual comb plate 132, and two virtual escalator steps 129 of the step belt 107 can be seen.

Since the physical step belt 7 has already been in operation for a few operating hours, the articulation points of its conveyor chains exhibit a certain amount of wear as a result of the constant relative movements between the chain links under load. This wear leads to an elongation of the step belt 7, so that the gap between two escalator steps 29 can become slightly larger. The wear-related elongation of the step belt 7 can be measured as described below in connection with FIG. 3A and this measured value can be transmitted to the ADRD 102 in that the corresponding characterizing properties are updated for the virtual components affected. If the measured value with all its effects on the components affected thereby is transmitted to the ADRD 102, the components of the virtual step belt 107 as well as the articulation points 128 of its conveyor chains 131 have the same wear-related changes, so that the gap between two virtual escalator steps 129 becomes slightly larger in the ADRD 102, as well.

Specifically, this means that the elongation of the conveyor chain 131 recorded as a measured value is divided between the number of articulation points 128 of the conveyor chain 131, so that the change in play per articulation point 128 can be determined. Depending on the strength properties of the chain pin 134 and the chain bushing 123 of the articulation point 28, this play is divided, for example, between the inner diameter of the chain bushing 123 and the outer diameter of the chain pin 134. As a result, the characterizing property "inner diameter" of the chain bushing 123 and the characterizing property "outer diameter" of the chain pin 134 of each articulation point 128 of the conveyor chains 131 change.

From this, for example, strength calculations can be carried out for the chain pins 134, so that the current safety factor of the virtual conveyor chain 131 and thus of the physical conveyor chain 31 against breakage can also be determined in the course of the analysis to be carried out according to the inventive method 100.

However, the wear described above leads not only to a weakening of the chain pin 134, but also to greater play within the articulation points 128. The effects of this greater play can be evaluated by means of dynamic simulations on the ADRD 102. In these simulations, for example, the escalator step 129 can move orthogonally to the provided direction of movement Z within this play (extremely exaggerated in FIG. 1) and, when the load F is unfavorable for this case, can tilt somewhat more than the normal play between the chain rollers 127 and the guide rails 125 would allow. If the play is too large and the tilt is too great, the leading edge 122 of the escalator step 129 can collide with the comb plate 132.

As already mentioned above, the measured values transmitted by the detection device can be provided with time information 103 and stored in a log file 104. Of course, the same can also be done with the characterizing properties of the virtual components of the ADRD 102, so that a traceable history is also available for the characterizing properties and a change trend for the corresponding characterizing properties can be calculated based on this history by means of known analytical methods. Using suitable extrapolation based on the history, the time of a possible damage event can be determined and preventive maintenance can be planned and carried out before this time. In the example described above, the remaining time can be extrapolated using the decrease in diameter of the chain pin 134 as a result of wear until there is a drop below the prescribed safety factor for the chain pin 134. Likewise, a possible point in time for a step collision with the comb plate 132 can be determined using the dynamic simulation described above, the earlier possible point in time of the two events determining the time for maintenance.

In order to limit the amount of data that occurs, a traceable history can also be created with only a few selected characterizing properties of a few selected components that are particularly subject to signs of wear.

For reasons of the manufacturing tolerances of the components and due to the settings made during the manufacture and/or start up and/or during prior maintenance, not every physical passenger transport system 2 has the exact same geometric relationships with regard to the components and their installation position. Strictly speaking, each physical passenger transportation system is unique in the totality of the characterizing properties of its components and accordingly all ADRD 102 differ (even if only slightly) from one another. In the region 60 selected by way of example, this leads to the fact that a certain sign of wear (quantitatively the same, on a specific component) can lead to a collision of escalator step 29 and comb plate in one physical passenger transport system 2, while in another physical passenger transport system 2 of the same design there is no risk of a collision for quite some time. This example makes it easy to see that, based on the analysis options that the ADRD 102 offers with its virtual components, for each physical component of a passenger transport system 2, its further use, its adjustment in its environment, or its replacement can determined using the ADRD 102, and appropriate maintenance work can be planned.

Figure 3A:
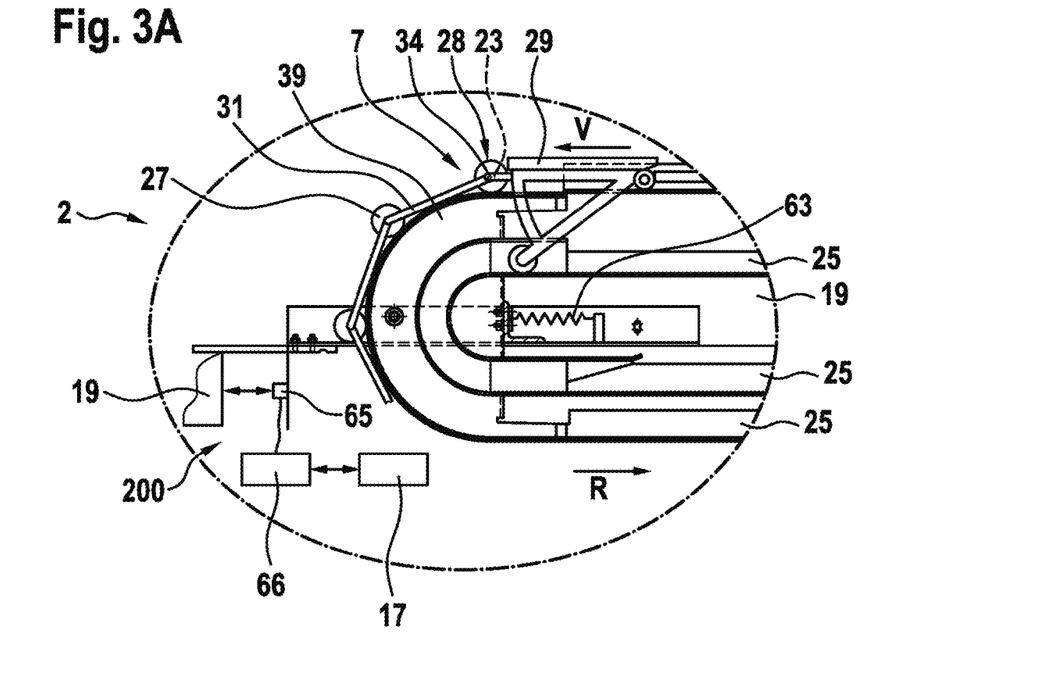
FIGS. 3A through 3C are enlarged representations of the various regions indicated in FIG. 2, parts of a detection device of the inventive device being arranged in each of these regions.
Figure 3B:
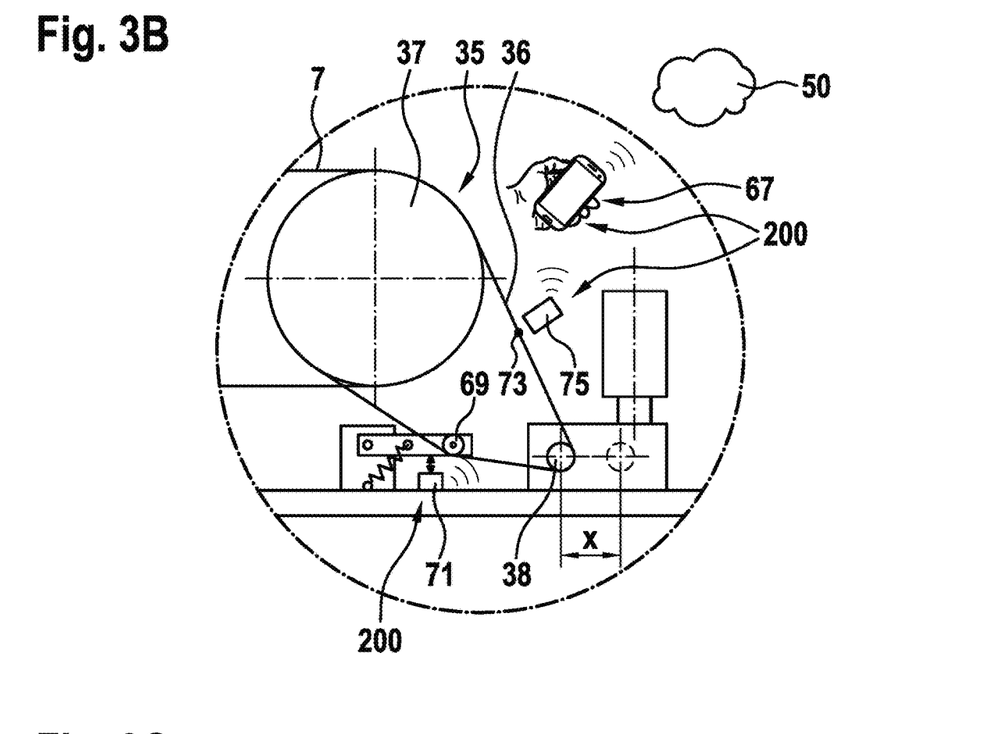
Figure 3C:
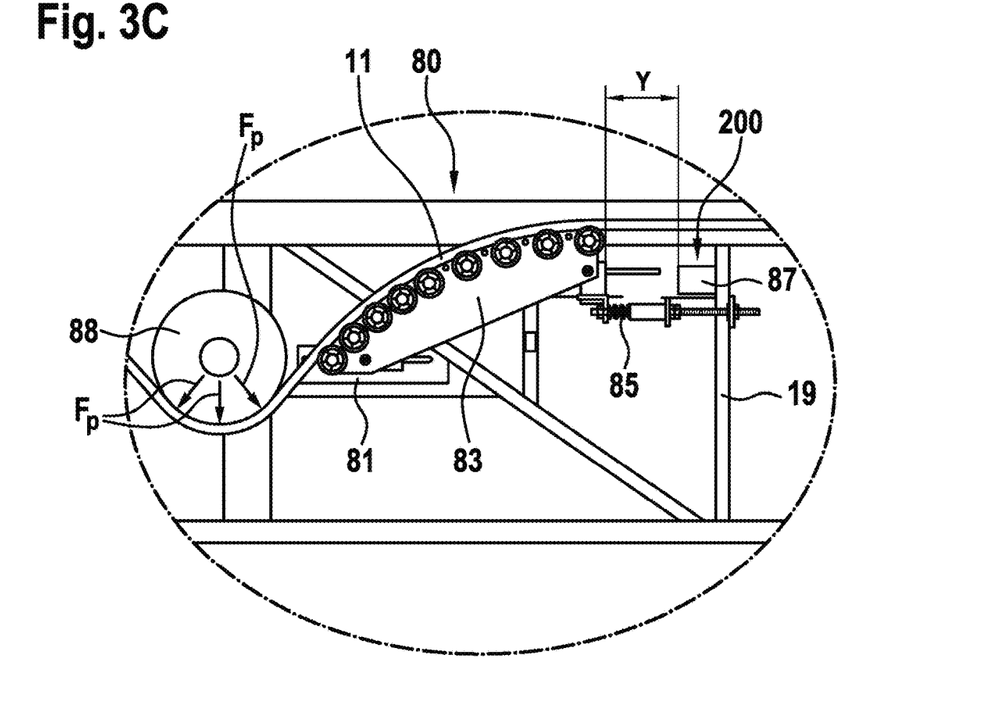

In the following, FIGS. 3A through 3C show, by way of example, how wear-related changes to traveling components of the physical passenger transport system 2 can be detected. To this end, the three regions indicated in FIG. 2 have been selected and shown enlarged in FIG. 3A through 3C, parts of a detection device 200 of the inventive device 1 being arranged in each of these regions.

FIG. 3A illustrates the deflection curve 39 of the physical passenger transport system 2 shown in FIG. 2 and arranged in the first level E1. The deflection curve 39 deflects the step belt 7 from an advance V to a return R.

For the sake of clarity, only one travel stage 29 and one part of the conveyor chain 31 from the step belt 7 are illustrated. The deflection curve 39 is also part of the conveyor chain tensioning device 40. To this end, the former is slidably mounted in a horizontal linear guide 61, so that the deflection curve 39 can be displaced relative to the guide rails 25 fixed in position on the support structure 19. A compression spring 63 arranged between the support structure 19 and the deflection curve 39 acts as clamping means. There is a pivoting movement in the articulation points 28 of the conveyor chain 31 at the at the point where the latter is deflected. These relative movements cause friction between a chain pin 34 and a chain bushing 23, which form the articulation point 28, and thus to material removal on the chain pin 34 and on the chain bushing 23. Due to these signs of wear, the play in the articulation points 28 gradually increases and the total increasing play in all articulation points 28 leads to elongation of the conveyor chain 31.

The chain elongation in turn leads to displacement of the deflection curve 39 relative to the guide rails 25 or to the support structure 19. As illustrated, this displacement can be measured continuously or periodically, for example, with a distance measuring sensor 65 arranged between the deflection curve 39 and the support structure 19. The measured values therefrom are transmitted to the control unit 17 of the passenger transport system 2 using a suitable transmission means 66, for example, via a CAN bus or via a Bluetooth connection. The distance measuring sensor 65 and the transmission means 66 are parts of the detection device 200.

As already shown in FIG. 1, the control unit 17 communicates via the interface 51 with the ADRD 102 installed in the data cloud 50, so that the measured value determined by the distance measuring sensor 65 can be transmitted. Then, based on this measured value, the characterizing properties of components affected by the measured values are updated in the ADRD 102. For example, the measured value can be used directly in order to update the characterizing property "horizontal position" of the existing virtual deflection curve in the ADRD 102. As already explained above, in order to update the outer diameter of the chain pin 34 and the inner diameter of the chain bushing 23, the diameter values thereof, which have changed due to wear, must first be calculated, which is why characterizing properties of these components are detected indirectly using the distance sensor 65.

The chain rollers 27 can also experience a change in diameter due to wear, which can cause an additional displacement of the deflection curve 39. Additional sensors or other detection principles (e.g., optical) would have to be provided in order to refine the distribution of the various characterizing properties of the affected components.

FIG. 3B illustrates the drive train 35 of the physical passenger transport system 2 shown in FIG. 2. In the illustrated embodiment, it is arranged in the second level E2. The drive chain 36 arranged in the drive train 35 between the drive sprocket 37 and a gear pinion 38 is also a traveling component which has to meet high safety requirements. As already described in detail in connection with the conveyor chain 31, the articulation points of the drive chain 36 are also subject to wear, which leads to elongation of the drive chain 36. There are various options for determining the elongation of the drive chain 36, and thus a change in the characterizing properties of the components affected by this type of wear, by means of a detection device 200, or by means of at least part thereof, and transmitting it to the ADRD 102.

The simplest option is for a technician assigned to do maintenance work to check the chain tension of the drive chain 36 as part of an inspection and to adjust it by moving the gear pinion 38 or the motor/gear unit relative to the drive sprocket 37. The technician measures the displacement X and enters this into a mobile input device 67 from which he also receives his maintenance instructions. This mobile input device 67 communicates via the control unit 17 of the passenger transport system 2, or directly, with the ADRD 102 implemented in the data cloud 50. It is also possible to store in the ADRD 102 maintenance-related queries, which, for example, require the technician to enter the displacement X before the physical passenger transport system 2 is released for operation.

Another option is to use a prestressing touch wheel 69 or chain tensioning wheel which engages in the chain loop of the drive chain 36 to detect its slack in that a sensor 71 continuously or periodically checks the position of the touch wheel 69. From this position, or from a change in position, taking into account the geometric relationships in this region, in particular using the diameter and the position of the gear pinion 38 and the diameter and the position of the drive sprocket 37, it is possible to calculate the elongation of the drive chain 36 and thus the play in its individual articulation points. From this, as explained using the example in FIG. 3A, it is then possible to determine the characterizing properties of the individual components of the drive chain 36. The measured values determined by the sensor 71 can be transmitted from the sensor 71 directly to the ADRD 102 via the control unit 17 or via wireless connections. The determination of the characterizing properties of the components affected by the measured value of the sensor 71 described above in rudimentary fashion is preferably carried out using the ADRD 102, in particular using the geometric relationships existing through the virtual component models.

A much more direct measuring method for measuring the elongation of the drive chain 36 is to add a marking 73 (magnet, color marking, RFID chip, etc.) to the drive chain 36. As the drive chain 73 travels, a suitable sensor 75 (optical, magnetic, RFID reader, etc.) detects the passing of the marking 73 as a pulse. The time measured between two detected pulses in relation to the speed of the drive chain 36 yields the effective length thereof. The speed of the drive chain 36 can be calculated from the speed of the step belt 7 specified by the control unit 17 by means of the transmission ratio.

A time difference can be determined from two measurements made at different times, and can be converted to the wear-related elongation of the drive chain 36, taking into account the speed at the time the measurements were made. The measurement values determined by the sensor 75 can be transmitted directly to the ADRD 102 via the control unit 17 or via wireless connections. The determination of the characterizing properties of the components affected by the measured value, described in the foregoing in rudimentary fashion, is preferably carried out using the ADRD 102 created in the data cloud 50 and the ADRD 102 is then updated accordingly.

A handrail tensioning device 80 is illustrated in FIG. 3C. It has a displaceable roller curve 83 guided on the support structure 19 by means of linear guides 81. The roller curve 83 is prestressed against the support structure 19 by means of a spring element 85. If the endless loop of the handrail 11 now elongates due to wear, the handrail tensioning device 80 compensates this elongation of the handrail 11 by displacing the roller curve 83 linearly. The distance Y to the roller curve 83 can be measured by means of a sensor 87 attached to the support structure 19. The sensor 87 can also be part of the detection device 200. The measured value of the sensor 87 is transmitted to the ADRD 102, and from this the characterizing properties of the virtual components affected by this measured value are determined and the affected virtual components of the ADRD 102 are updated accordingly.

Since the spring prestressing of the spring element 85 is a function of the distance Y for a given setting, the tensile force in the handrail 11 or handrail belt can be calculated from the existing geometry. The contact pressure Fp and the force transmission from the handrail drive wheel 88 to the handrail 11 can then be calculated from this tensile force (Euler-Eytelwein formula). All these forces are also characterizing properties for those components on which they act and in ADRD 102 replace the corresponding older characterizing properties of virtual components or component model datasets therein.

Figure 4:
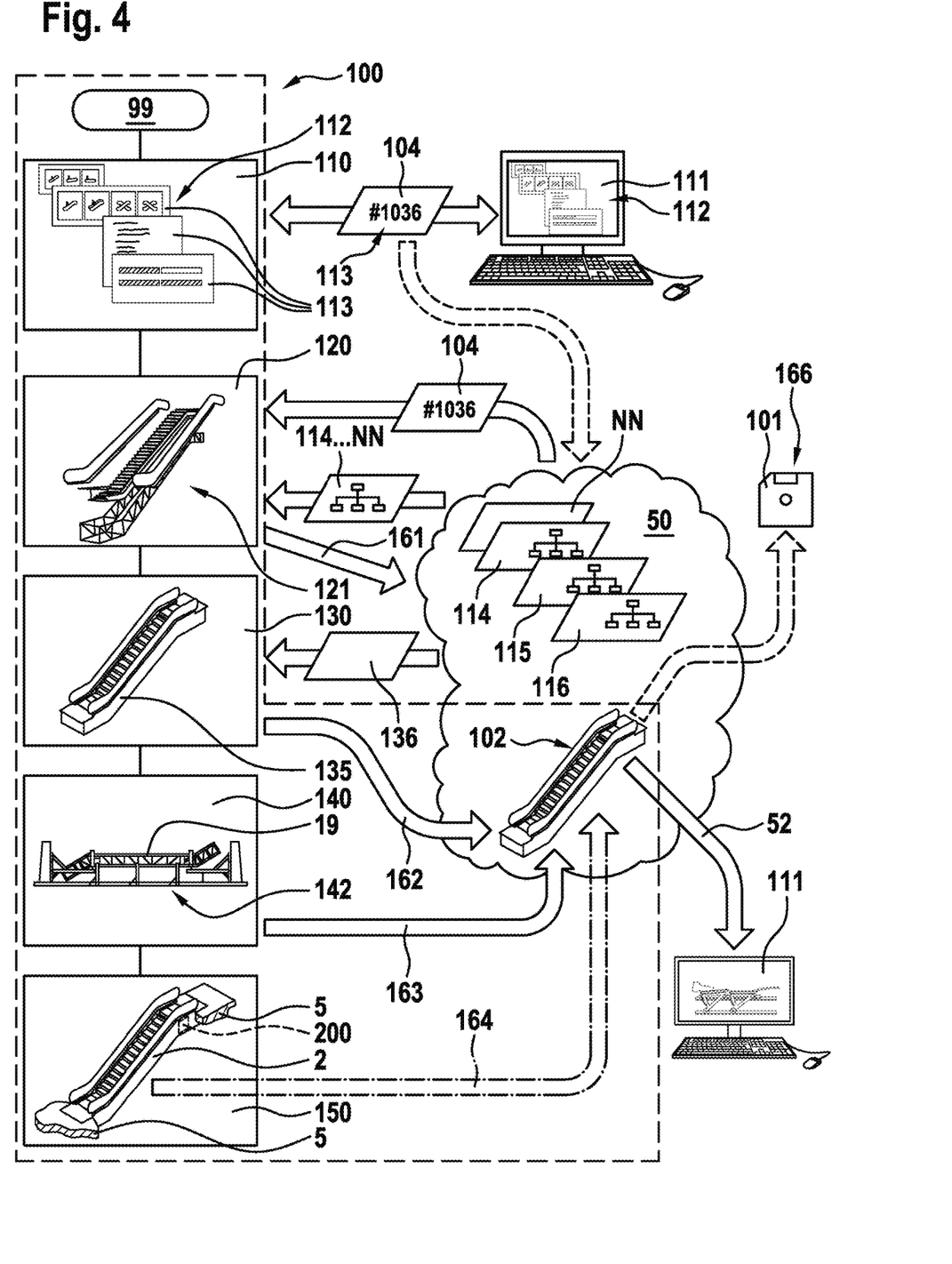
FIG. 4 illustrates creation of an actualized digital replica dataset (ADRD) and the production of a physical passenger transport system as well as the start-up thereof and the continuous updating of the ADRD from configuration to operation of the physical passenger transport system.

FIG. 4 uses a diagram provided with additional information to illustrate the most important method steps of the inventive method 100 (indicated by a broken line) for creating an ADRD 102, producing a physical passenger transport system 2 during this creation, and the start-up of the physical passenger transport system 2, and continuous updating of the ADRD 102. The primary method steps of the method 100 can be include the following:

In a first method step 110, acquiring the customer-specific configuration data 113;
In a second method step 120, creating a commissioning digital replica dataset, including component model datasets and the customer-specific configuration data 113;
In a third method step 130, transmitting the commissioning digital replica dataset to a production digital replica dataset;
In a fourth method step 140, producing the physical passenger transport system 2 using the production digital replica dataset; and,
In a fifth method step 150, installing the physical passenger transport system 2 in a building 5 and continuously updating the ADRD 102.

All data processing and data storage, as well as the step-by-step creation of the ADRD 102, can take place, for example, via the data cloud 50.

The starting position 99 for executing the inventive method 100 can be planning and later creating or converting a building 5, such as a shopping center, an airport building, a subway station, or the like. A passenger transport system 2 configured as an escalator or moving walkway is also optionally provided. The desired passenger transport system 2 is configured based on the operational profile and installation conditions.

For example, an internet-based configuration program which is permanently or temporarily installed in a computer system 111 can be available for this purpose. Customer-specific configuration data 113 are queried using various input masks 112 and stored in a log file 104 under an identification number. The log file 104 can be stored, for example, in the data cloud 50. The architect of the building 5 can optionally be provided with a digital envelope model using his customer-specific configuration data 113, and he can insert this envelope model into his digital building model for the purpose of visualizing the planned building. Coordinates of the intended installation space, the required maximum conveying capacity, conveying height, operating environment, etc., are queried, for example, as customer-specific configuration data 113.

If the architect is satisfied with the passenger transport system 2 he has configured, he can order it from the manufacturer by specifying the customer-specific configuration data 113, for example, by referring to the identification number or the identification code of the log file 104.

When an order is received, represented by the second method step 120, which is referenced to a log file 104, a digital replica dataset 121 specifying a target configuration is initially created. When creating the digital replica dataset 121, component model datasets 114, 115, ..., NN which are provided for manufacturing the physical components are used. This means that for each physical component, a component model dataset 114, 115, ..., NN is stored, for example, in the data cloud 50 and contains all the characterizing properties (dimensions, tolerances, material properties, surface quality, interface information for further component model datasets, etc.) for this component in a target configuration.

Now the component model datasets 114, 115, ..., NN required to create the digital replica dataset 121 are selected, and their number and arrangement in three-dimensional space are determined, by means of the customer-specific configuration data 113. These component model datasets 114, 115, ..., NN are then combined by means of their interface information to form a corresponding digital replica dataset 121 of the passenger transport system 2. It is obvious that an escalator or moving walkway comprises several thousand individual parts (represented by the reference symbols ..., NN) and consequently just as many component model datasets 114, 115, ..., NN must be used and processed to create a digital replica dataset 121. The digital replica dataset 121 has target data for all physical components to be manufactured or procured, these target data representing characterizing properties of the components required to construct the passenger transport system 2 in a target configuration. As illustrated by the arrow 161, the digital replica dataset 121 can be stored in the data cloud 50 and to a certain extent also forms the starting basis for the ADRD 102.

In the third method step 130, the commissioning digital replica dataset 135, which contains all the production data required for producing the commissioned passenger transport system 2, is created by supplementing the digital, three-dimensional replica dataset 121 with production-specific data 136. Such production-specific data 136 can include, for example, the production location, the material that can be used at this production location, the production means used to produce the physical component, lead times, and the like. As illustrated by arrow 162, this supplementing step is carried out in ADRD 102, which is still being constructed.

According to the fourth method step 140, the commissioning digital replica dataset 135 can then be used in the production facilities 142 of the manufacturing plant (herein represented by welding template for a support structure 19) to enable production of the physical components (represented by a support structure 19) of the physical passenger transport system 2. The assembly steps for the physical passenger transport system 2 are also defined in the commissioning digital replica dataset 135. During and after the manufacture of the physical components and during the assembly of the resulting physical passenger transport system 2, at least some of the characterizing features of components and assembled component groups are recorded, for example, using measurement and non-destructive testing methods, and are assigned to the corresponding virtual components and transmitted to the still unfinished ADRD 102. The actual data measured on the physical components replace the assigned target data of the commissioning digital replica dataset 135 as the characterizing properties. As production progresses, the commissioning digital replica dataset 135 increasingly becomes the ADRD 102 with this transmission, illustrated by the arrow 163. However, it is still not entirely complete; instead, a so-called production digital replica dataset is formed first.

As shown in the fifth method step 150, after completion the physical passenger transport system 2 can be installed in the building 5 according to the architect's plans. Since certain adjustments have to be made during installation and operating data arise even during the initial start-up, these data are also transmitted to the production digital replica dataset and converted to characterizing properties of the virtual components affected thereby. With this update, illustrated by the dash-dotted arrow 164, the production digital replica dataset becomes the ADRD 102, and, like the physical passenger transport system 2, reaches full operational readiness. From this point in time, the ADRD 102 can be loaded into the computer system 111 at any time and used for detailed analysis of the state of the physical passenger transport system 2.

The fifth method step 150 does not, however, represent the actual conclusion of the inventive method 100. This conclusion does not occur until the end of the service life of the physical passenger transport system 2, wherein in this case the data of the ADRD 102 can be used for the last time for the process of disposing of the physical components.

As described in detail above and symbolized by the dash-dotted arrow 164, the ADRD 102 is updated continuously and/or periodically throughout the entire service life of the passenger transport system 2 by the transmission of measurement data. As already mentioned, these measurement data can be recorded both by the detection device 200 and by an input, for example, by maintenance personnel, and transmitted to the ADRD 102. Of course, the ADRD 102 can be stored together with the program instructions 166 required for working with the ADRD 102 on any storage medium as computer program product 101.

Although FIGS. 1 through 4 relate to different aspects of the present disclosure and these have been described in detail using the example of an escalator, it is obvious that the described method steps and a corresponding device may be used in the same way for moving walkways, as well. Finally, it should be noted that terms such as "having," "comprising," etc., do not preclude other elements or steps, and terms such as "a" or "an" do not preclude a plurality. Furthermore, it should be noted that features or steps that have been described with reference to one of the above exemplary embodiments can also be used in combination with other features or steps of other exemplary embodiments described above. Reference signs in the claims should not be considered limiting.

The invention claimed is:

1. A method for monitoring a state of a physical passenger transport system using an actualized digital replica dataset (ADRD) which includes characterizing properties of components of the physical passenger transport system in a machine-processable manner after assembly and installation thereof in a building, wherein at least one detection device is arranged in the physical passenger transport system and detects changes in at least one characterizing property that is caused by wear on a traveling physical component of the physical passenger transport system, wherein the ADRD is generated by:

creating a commissioning digital replica dataset from component model datasets with target data which reproduce characterizing properties of components of the passenger transport system in a target configuration;

creating a production digital replica dataset based on the commissioning digital replica dataset by measuring actual data which reproduce characterizing properties of components of the physical passenger transport system in the actual configuration of the passenger transport system immediately after assembly and installation thereof in a building and replacing target data in the commissioning digital replica dataset with corresponding actual data; and creating and continuously updating the ADRD based on the production digital replica dataset by modifying the production digital replica dataset during the operation of the physical passenger transport system, taking into account measured values acquired by the detection device which reproduce changes in characterizing properties of traveling components of the physical passenger transport system during its operation; in that these changes are transmitted to the ADRD as measurement data and the characterizing properties of the component model datasets affected by the transmitted measurement data are updated accordingly.

2. The method according to claim 1, wherein monitoring can be used to track and evaluate changes and trends in changes in the at least one updated characterizing property of the traveling physical component and influence of said changes on the component and on the components interacting with this component with the assistance of the ADRD using calculations and/or using static and dynamic simulations.

3. The method according to claim 1, wherein the measurement data transmitted by the detection device are stored in a log file with time information.

4. The method according to claim 3, wherein a change trend of the measured values is determined by means of statistical methods using the measurement data stored in the log file and operating data stored in the log file.

5. The method according to claim 4, wherein the transmission of the measured values takes place periodically or as a function of the change trend of the measured values.

6. The method according to one of the claim 1, wherein the wear-related characterizing property of the traveling physical component is selected from a group comprising geometric dimensions of the component, weight of the component, and surface quality of the component.

7. The method according to claim 6, wherein the characterizing property of the traveling physical component measured by the detection device, which characterizing property is changed due to wear, is the length of a drive chain or is slack in the drive chain resulting from wear-related change in length, is the length of a conveyor chain or a displacement of a deflection curve resulting from the wear-related change in length in the conveyor chain tensioning device thereof, or is the length of a handrail or a displacement of a roller curve resulting from the wear-related change in length of the handrail tensioning device thereof.

8. The method according to claim 1, wherein monitoring of the state of the physical passenger transport system includes simulating future characterizing properties of the physical passenger transport system using the ADRD.

9. The method according to claim 1, further comprising:
planning maintenance work to be carried out on the physical passenger transport system based on information about the monitored state of the passenger transport system.

10. The method according to claim 1, further comprising:
evaluating quality properties of one of the traveling components based on an analysis of the ADRD of a plurality of passenger transport systems containing the relevant traveling component.

11. The method according to claim 1, wherein creating the commissioning digital replica dataset includes creating a digital replica dataset from component model datasets taking into account customer-specific configuration data, as well as creating production data by modifying the digital replica dataset taking into account production-specific data.

12. A device for carrying out the method according to claim 1, the device comprising:
an ADRD which reproduces characterizing properties of components of the physical passenger transport system in an actual configuration of the physical passenger transport system in a machine-processable manner after assembly and installation thereof in a building; and,
at least one detection device using which changes occurring in at least one characterizing property due to wear on a traveling physical component of the physical passenger transport system can be detected;
wherein these changes can be transmitted to the ADRD as measurement data for the purpose of updating existing data, characterized in that the ADRD can be generated by:
creating a commissioning digital replica dataset with target data which reproduce the characterizing properties of components of the passenger transport system in a target configuration;
creating a production digital replica dataset based on the commissioning digital replica dataset by measuring actual data which reproduce characterizing properties of components of the passenger transport system in the actual configuration of the passenger transport system immediately after assembly and installation thereof in a building and replacing target data in the commissioning digital replica dataset with corresponding actual data; and
creating and continuously updating the ADRD based on the production digital replica dataset by modifying the production digital replica dataset during the operation of the physical passenger transport system, taking into account measured values acquired by the detection device which reproduce changes in the characterizing properties of traveling components of the physical passenger transport system during operation thereof.

13. A physical passenger transport system comprising a device according to claim 12.

14. A non-transitory computer-readable medium comprising instructions that, when executed, cause a processor to monitor a state of a physical passenger transport system using an actualized digital replica dataset (ADRD) which includes characterizing properties of components of the physical passenger transport system in a machine-processable manner after assembly and installation thereof in a building, wherein at least one detection device is arranged in the physical passenger transport system and detects changes in at least one characterizing property that is caused by wear on a traveling physical component of the physical passenger transport system, wherein the ADRD is generated by:
creating a commissioning digital replica dataset from component model datasets with target data which reproduce characterizing properties of components of the passenger transport system in a target configuration;
creating a production digital replica dataset based on the commissioning digital replica dataset by measuring actual data which reproduce characterizing properties of components of the physical passenger transport system in the actual configuration of the passenger transport system immediately after assembly and installation thereof in a building and replacing target data in the commissioning digital replica dataset with corresponding actual data; and
creating and continuously updating the ADRD based on the production digital replica dataset by modifying the production digital replica dataset during the operation of the physical passenger transport system, taking into account measured values acquired by the detection device which reproduce changes in characterizing properties of traveling components of the physical passenger transport system during its operation; in that these changes are transmitted to the ADRD as measurement data and the characterizing properties of the component model datasets affected by the transmitted measurement data are updated accordingly.

* * * * *

UNITED STATES PATENT AND TRADEMARK OFFICE
CERTIFICATE OF CORRECTION

PATENT NO. : 12,221,321 B2  
APPLICATION NO. : 16/980775  
DATED : February 11, 2025  
INVENTOR(S) : Thomas Novacek et al.

Page 1 of 1

It is certified that error appears in the above-identified patent and that said Letters Patent is hereby corrected as shown below:

In the Specification

In Column 17, Line 4, delete "also FIG. 3A" and insert --also FIGS. 3A--.

In Column 17, Line 15, delete "with FIG. 3A" and insert --with FIGS. 3A--.

In Column 19, Line 1, delete "in FIG. 3A" and insert --in FIGS. 3A--.

In Column 19, Line 18, delete "at the at the" and insert --at the--.

In the Claims

In Column 24, Claim 6, Line 48, delete "to one of the claim" and insert --to claim--.

Signed and Sealed this  
Fifteenth Day of April, 2025

Coke Morgan Stewart  
*Acting Director of the United States Patent and Trademark Office*